(12) United States Patent
Tseng et al.

(10) Patent No.: US 6,732,000 B2
(45) Date of Patent: May 4, 2004

(54) UNIFIED METHOD AND SYSTEM FOR MANUFACTURING TOOL SET PERFORMANCE ANALYSIS

(75) Inventors: Ta-Feng Tseng, Shanhua Jen (TW); Lee-Chung Lin, Pingtung (TW)

(73) Assignee: Taiwan Semiconductor Manufacturing Co., Ltd, Hsin Chu (TW)

( * ) Notice: Subject to any disclaimer, the term of this patent is extended or adjusted under 35 U.S.C. 154(b) by 24 days.

(21) Appl. No.: 10/159,225

(22) Filed: May 30, 2002

(65) Prior Publication Data

US 2003/0225471 A1 Dec. 4, 2003

(51) Int. Cl.$^7$ .............................................. G06F 19/00
(52) U.S. Cl. ...................... 700/108; 700/109; 700/110; 700/111
(58) Field of Search ................................. 700/110, 109, 700/108, 111

(56) References Cited

U.S. PATENT DOCUMENTS

| | | | |
|---|---|---|---|
| 5,528,510 A | | 6/1996 | Kraft |
| 5,708,828 A | * | 1/1998 | Coleman ................. 715/523 |
| 5,914,879 A | | 6/1999 | Wang et al. |
| 6,128,628 A | * | 10/2000 | Waclawski et al. ......... 707/203 |
| 6,263,255 B1 | * | 7/2001 | Tan et al. .................. 700/121 |

* cited by examiner

Primary Examiner—Leo Picard
Assistant Examiner—Michael D. Masinick
(74) Attorney, Agent, or Firm—Tung & Associates

(57) ABSTRACT

Within a system and a method for determining performance of a plurality of manufacturing tools which generates a plurality of tool operation data sets in a plurality of non-uniform data analysis formats, there is employed a uniform data analysis format into which is translated the plurality of tool operation data sets in the plurality of non-uniform data analysis formats. The system and the method provide for enhanced efficiency for determining performance of the plurality of manufacturing tools.

8 Claims, 1 Drawing Sheet

| ASPU10-OrDe-cE | S | 2001-08-07 | 00:00:12 | +1=G10166 | .1+r=DEGAS M1 | +w=3 |
| ASPU10-Sput-c1 | S | 2001-08-07 | 00:00:18 | +1=G10166 | .1+r=ALCU-4K-2STEP | +w=1 |
| ASPU10-Sput-c2 | C | 2001-08-07 | 00:00:28 | +1=G10148 | .1+r=ARC-250 | +w=23 |
| ASPU10-Wait-cA | S | 2001-08-07 | 00:00:30 | +1=G10166 | .1+r=CHA WAIT 20S | +w=2 |
| ASPU10-Sput-c4 | C | 2001-08-07 | 00:00:49 | +1=G10148 | .1+r=ALCU-4K-2STEP | +w=25 |
| ASPU10-Sput-c3 | C | 2001-08-07 | 00:00:51 | +1=G10148 | .1+r=ARC-250 | +w=24 |
| 21 | 22 | 23 24 | 25 | 26 | 27 | 28 |

UNIFIED METHOD AND SYSTEM FOR MANUFACTURING TOOL SET PERFORMANCE ANALYSIS

BACKGROUND OF THE INVENTION

1. Field of the Invention

The present invention relates generally to systems and methods for assessing tool performance within manufacturing facilities. More particularly, the present invention relates to systems and methods for efficiently assessing tool performance within manufacturing facilities.

2. Description of the Related Art

Common in the art of manufacturing complex products, and in particular manufacturing complex microelectronic products such as complex integrated circuit products, is the use of extensive and sophisticated tool sets. The use of extensive and sophisticated tool sets is generally required when manufacturing complex products, and in particular when manufacturing complex integrated circuit products, insofar as, in particular, integrated circuit product complexity is generally not readily effected absent an extensive and sophisticated tool set.

While extensive and sophisticated tool sets are thus desirable in the art of microelectronic product fabrication and often essential in the art of microelectronic product fabrication, extensive and sophisticated tool sets are nonetheless not entirely without problems in the art of microelectronic product fabrication. In that regard, it is often difficult in the art of microelectronic product fabrication to efficiently comparatively assess individual microelectronic fabrication tool performance within an extensive and sophisticated microelectronic fabrication tool set.

It is thus desirable in the art of microelectronic fabrication to provide systems and methods for more efficiently comparatively assessing microelectronic fabrication tool performance within an extensive and sophisticated microelectronic fabrication tool set.

It is towards the foregoing object that the present invention is directed.

Various microelectronic fabrication tool performance systems and methods have been disclosed in the art of microelectronic fabrication.

Such systems and methods are typically predicated upon an algorithmic analysis of operation of microelectronic fabrication tools. Examples of such systems and methods are disclosed within Kraft, in U.S. Pat. No. 5,528,510 and Wang et al., in U.S. Pat. No. 5,914,879, the teachings of which are incorporated herein fully by reference.

Desirable in the art of microelectronic fabrication are additional systems and methods for efficiently comparatively assessing microelectronic fabrication tool performance within an extensive and sophisticated microelectronic fabrication tool set.

It is towards the foregoing object that the present invention is directed.

SUMMARY OF THE INVENTION

A first object of the present invention is to provide a system and a method for assessing microelectronic fabrication tool performance within a microelectronic fabrication tool set.

A second object of the present invention is to provide a system and a method in accord with the first object of the present invention, wherein the microelectronic fabrication tool performance is efficiently assessed.

In accord with the objects of the present invention, the present invention provides a system for assessing tool performance within a manufacturing facility and a method for assessing tool performance within the manufacturing facility.

In accord with the method, there is first defined a uniform data analysis format. There is then developed a uniform set of tool performance analysis models predicated upon the uniform data analysis format. There is then provided a plurality of manufacturing tools which generates a plurality of tool operation data sets in a plurality of non-uniform data analysis formats. There is then translated the plurality of tool operation data sets in the plurality of non-uniform data analysis formats to a corresponding plurality of tool operation data sets in the uniform data analysis format. Finally, there is then determined a plurality of tool performance characteristics for the plurality of manufacturing tools while employing the uniform set of tool performance analysis models and the plurality of tool operation data sets in the uniform data analysis format.

The method of the present invention contemplates a system which effects the method of the present invention.

The present invention provides a system and a method for assessing microelectronic fabrication tool performance within a microelectronic fabrication tool set, wherein the microelectronic fabrication tool performance is efficiently assessed.

The present invention realizes the foregoing object by defining a uniform data analysis format into which is translated a plurality of tool operation data sets originally in a plurality of non-uniform data analysis formats, to provide a corresponding plurality of tool operation data sets in the uniform data analysis format, such that in conjunction with a uniform set of tool performance analysis models, there may be determined a plurality of tool performance characteristics for a plurality of manufacturing tools which generates the plurality of tool operation data, sets in the plurality of non-uniform data analysis formats. By employing the uniform data analysis format, an individual tool performance analysis for each of the manufacturing tools may be avoided and thus tool performance analysis efficiency is realized.

BRIEF DESCRIPTION OF THE DRAWINGS

The objects, features and advantages of the present invention are understood within the context of the Description of the Preferred Embodiment, as set forth below. The Description of the Preferred Embodiment is understood within the context of the accompanying drawings, which form a material part of this disclosure, wherein.

DESCRIPTION OF THE PREFERRED EMBODIMENT

Figures 1, 2:
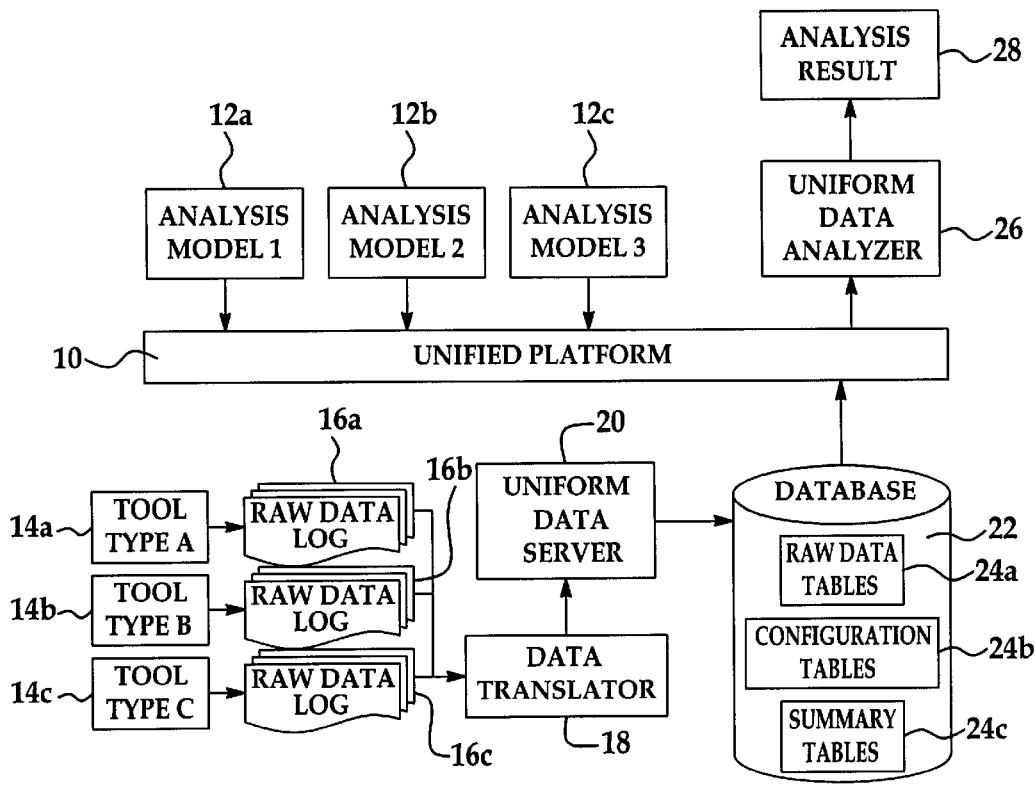
FIG. 1 shows a schematic block diagram illustrating a system in accord with the present invention, through which may be practiced a method in accord with the present invention.
FIG. 2 shows a table illustrating a series of uniform data analysis format tool operation data messages in accord with the present invention.

The present invention provides a system and a method for assessing microelectronic fabrication tool performance within a microelectronic fabrication tool set, wherein the microelectronic fabrication tool performance is accurately assessed.

The present invention realizes the foregoing object by defining a uniform data analysis format into which is translated a plurality of tool operation data sets originally in a plurality of non-uniform data analysis formats, to provide a corresponding plurality of tool operation data sets in the uniform data analysis format, such that in conjunction with a uniform set of tool performance analysis models, there may be determined a plurality of tool performance characteristics for a plurality of manufacturing tools which generates the plurality of tool operation data sets in the plurality of non-uniform data analysis formats. By employing the uniform data analysis format, an individual tool performance analysis for each of the manufacturing tools may be avoided and thus tool performance analysis efficiency is realized.

Although the present invention provides particular value within the context of determining performance of a plurality of semiconductor manufacturing tools within a semiconductor integrated circuit microelectronic fabrication facility, the present invention is not intended to be so limited. Rather, the present invention may be employed for determining performance of a plurality of manufacturing tools within manufacturing facilities including but not limited to chemical manufacturing facilities, mechanical manufacturing facilities and electrical (including electronic and microelectronic) manufacturing facilities. With respect to microelectronic manufacturing facilities, the present invention may be employed with respect to determining performance of a plurality of manufacturing tools within microelectronic manufacturing facilities including but not limited to integrated circuit microelectronic manufacturing facilities, ceramic substrate microelectronic manufacturing facilities and optoelectronic microelectronic manufacturing facilities.

Referring now to FIG. 1, there is shown a schematic block diagram illustrating various components within a system in accord with the present invention within which may be practiced a method in accord with the present invention. As is understood by a person skilled in the art, the system in accord with the present invention is a computer operated or computer assisted system which provides a computer operated or computer assisted method.

Shown in FIG. 1, and in accord with the block which corresponds with reference numeral 10, is a unified platform which is intended as a unified data transfer and analysis format for transfer and analysis of data in accord with the system of the present invention and the method of the present invention. Within the present invention, a specific but not limiting example of a unified data transfer and analysis format is provided below. As is understood by a person skilled in the art, a uniform data transfer and analysis format is an integral feature of the present invention insofar as it is common in the art of microelectronic fabrication for individual and unrelated microelectronic manufacturing tools to provide non-uniform data transfer and analysis formats. Thus, the present invention has particular applicability within sets of microelectronic manufacturing tools other than cluster tools or otherwise related sets of microelectronic manufacturing tools.

Also shown within the schematic block diagram of FIG. 1 is a series of analysis models 12a, 12b and 12c with respect to the unified platform 10. Such analysis models will typically be directed towards substrate processing characteristics applicable to each of a series of manufacturing tools, such substrate processing characteristics including but not limited to process time analysis, idle time analysis, bottleneck capacity analysis and throughput analysis. Exemplary algorithms for such models may be found within the related art references as described within the Description of the Related Art.

Also shown within the schematic block diagram of FIG. 1 is a series of tools 14a, 14b and 14c, each of varying tool type. Within the present invention, the varying tool types A, B and C, within the context of the present invention as directed towards semiconductor integrated circuit fabrication, may include but are not limited to, ion implant tool types, thin film layer deposition tool types, wet chemical etch tool types and reactive ion etch tool types, each providing a tool operation data set in a non-uniform data analysis format.

As is further illustrated within the schematic block diagram of FIG. 1, the series of tool operation data sets which are generated by each of the tools 14a, 14b and 14c within the non-uniform data analysis formats is in a first instance stored in a corresponding raw data log 16a, 16b or 16c. As is understood by a person skilled in the art, each of the non-uniform data analysis formats may be derived in part from Semiconductor Equipment Communications Standard (SECS) standards.

In accord with the present invention, each of the tool operation data sets in the non-uniform data analysis formats as generated by the series of tools 14a, 14b and 14c, and stored within the raw data logs 16a, 16b and 16c, is translated within a data translator 18 to provide a corresponding series of tool operation data sets in a uniform data analysis format in accord with the unified platform 10.

In turn, the tool operation data sets in the uniform data analysis format are fed to a uniform data server 20 which in turn forwards the tool operation data sets in the uniform data analysis format to a database 22. Within the database 22 there is maintained: (1) a series of raw data tables 24a which accepts the tool operation data sets in the uniform data analysis format; (2) a series of configuration tables 24b which allows for hypothetical calculations of various hypothetical configurations of a series of manufacturing tools; and (3) a series of summary tables 24c which is intended to provide a generalized framework for efficient data manipulation and presentation.

Within the preferred embodiment of the present invention, at least one of the analysis models from the series of analysis models 12a, 12b and 12c is merged within the unified platform 10 with a uniform tool operation data set from the database 22 for purposes of further analysis within a uniform data analyzer 26 such as to yield an analysis result 28 in accord with the analysis model 12a, 12b or 12c.

Referring now to FIG. 2, there is shown a table illustrating uniform data format tool operation data set messages in accord with the preferred embodiment of the present invention.

As is illustrated within the table of FIG. 2: (1) the data column which corresponds with reference numeral 21 corresponds with an arbitrary tool identification number; (2) the column which corresponds with reference numeral 22 corresponds with a tool chamber group name within a particular tool (i.e., a transfer chamber, a waiting chamber or a processing chamber); (3) the column which corresponds with reference numeral 23 corresponds with an arbitrary chamber identification number; (4) the column which corresponds with reference numeral 24 corresponds with an event status (i.e., waiting, started or completed); (5) the column which corresponds with reference numeral 25 corresponds with a measured date and time; (6) the column which corresponds with reference numeral 26 corresponds with a processed substrate lot identification number; (7) the column which corresponds with reference numeral 27 corresponds with a manufacturing recipe identification number;

and (8) the column which corresponds with reference numeral 28 corresponds with an arbitrary wafer identification number.

Within the context of the present invention, and in conjunction with an appropriate analysis model, performance of a plurality of manufacturing tools may be efficiently determined in conjunction with tool operation data sets provided in the foregoing uniform data analysis format.

As is understood by a person skilled in the art, the preferred embodiment of the present invention is illustrative of the present invention rather than limiting of the present invention. Revisions and modifications may be made to systems and methods in accord with the preferred embodiment of the present invention, while still providing systems and methods in accord with the present invention, further in accord with the accompanying claims.

What is claimed is:

1. A computer based method for determining performance of a plurality of manufacturing tools comprising:

defining a uniform data analysis format;

developing a uniform set of tool performance analysis models predicted upon the uniform data analysis format;

providing a plurality of manufacturing tools which generates a plurality of tool operation data sets in a plurality of non-uniform data analysis formats;

translating the plurality of tool operation data sets in the plurality of non-uniform data analysis formats to a corresponding plurality of tool operation data sets in the uniform data analysis format; and determining a plurality of tool performance characteristics for the plurality of manufacturing tools while employing the uniform set of tool performance analysis models and the plurality of tool operation data sets in the uniform data analysis format.

2. The method of claim 1 wherein the plurality of manufacturing tools is employed within a manufacturing facility selected from the group consisting of chemical manufacturing facilities, mechanical manufacturing facilities and electrical manufacturing facilities.

3. The method of claim 1 wherein the plurality of manufacturing tools is employed within a microelectronic manufacturing facility selected from the group consisting of integrated circuit microelectronic manufacturing facilities, ceramic substrate microelectronic manufacturing facilities and optoelectronic microelectronic manufacturing facilities.

4. The method of claim 1 wherein the plurality of manufacturing tools does not comprise a cluster tool.

5. A system for determining performance of a plurality of manufacturing tools comprising:

a uniform data analysis format;

a uniform set of tool performance analysis models predicated upon the uniform data analysis format;

means for translating a plurality of tool operation data sets in a plurality of non-uniform data analysis formats to a corresponding plurality of tool operation data sets in the uniform data analysis format; and means for determining a plurality of tool performance characteristics for the plurality of manufacturing tools while employing the uniform set of tool performance analysis models and the plurality of tool operation data sets in the uniform data analysis format.

6. The system of claim 5 wherein the plurality of manufacturing tools is employed within a manufacturing facility selected from the group consisting of chemical manufacturing facilities, mechanical manufacturing facilities and electrical manufacturing facilities.

7. The system of claim 5 wherein the plurality of manufacturing tools is employed within a microelectronic manufacturing facility selected from the group consisting of integrated circuit microelectronic manufacturing facilities, ceramic substrate microelectronic manufacturing facilities and optoelectronic microelectronic manufacturing facilities.

8. The system of claim 5 wherein the plurality of manufacturing tools does not comprise a cluster tool.

* * * * *